United States Patent

Phelps et al.

Patent Number: 5,972,275
Date of Patent: Oct. 26, 1999

[54] METHOD OF RELIEVING STRESSES IN EXTRUDED MEMBERS HAVING REINFORCING BARS

[75] Inventors: Ronald W. Phelps; Steven J. Alexander, both of Winchester, Va.

[73] Assignee: Seaward International, Inc., Clearbrook, Va.

[21] Appl. No.: 08/957,706

[22] Filed: Oct. 24, 1997

[51] Int. Cl.⁶ .......................... B29C 47/02; B29C 47/88; B29C 47/92
[52] U.S. Cl. ........................ 264/449; 264/40.6; 264/138; 264/148; 264/171.13; 264/171.14
[58] Field of Search .................................. 264/40.6, 138, 264/148, 171.13, 171.14, 449

[56] References Cited

U.S. PATENT DOCUMENTS

| | | |
|---|---|---|
| 2,319,105 | 5/1943 | Billner . |
| 2,727,293 | 12/1955 | Barnett et al. . |
| 3,167,882 | 2/1965 | Abbott . |
| 3,784,732 | 1/1974 | Whitfill, Jr. . |
| 3,960,995 | 6/1976 | Kourkene . |
| 4,526,732 | 7/1985 | Kakii et al. . |
| 4,743,320 | 5/1988 | Shaw . |
| 4,780,166 | 10/1988 | Hunter . |
| 5,271,876 | 12/1993 | Ibar . |
| 5,367,854 | 11/1994 | Kim . |
| 5,451,351 | 9/1995 | Blackmore . |
| 5,580,642 | 12/1996 | Okamoto et al. . |
| 5,650,224 | 7/1997 | March et al. . |
| 5,658,519 | 8/1997 | March et al. . |

Primary Examiner—Leo B. Tentoni
Attorney, Agent, or Firm—Blank Rome Comisky & McCauley LLP

[57] ABSTRACT

Stresses are relieved in elongated extruded plastic members by passing electric currents through electrical conductors embedded in the reinforcing bars. The reinforcing bars are manufactured according to a pultrusion process in which 1/16 inch diameter MIG wire is introduced into a roving bundle of impregnated fibers and drawn through a curing and shaping die. The resulting product is a rigid reinforcing bar having a longitudinal wire extending its entire length. The reinforcing bars are cut to lengths corresponding to the desired lengths of the elongated members to be extruded. The elongated member is manufactured using an extrusion process in which molten plastic surrounds a plurality of reinforcing bars to form a continuously extruded member. The member is cooled, cut at the reinforcing bar joints, and prepared for electrical resistance heating. Electrical contacts are inserted into bores provided in the ends of each reinforcing bar and are placed in electrical contact with the embedded wire. An alternating current, fed from a source through an isolation transformer, passes through the embedded wires in the reinforcing bars to generate heat. The reinforcing bars are heated to a temperature in a predetermined temperature range between about 185 and 200° F. and maintained at a temperature within that range for a predetermined period of time by turning on and off the power source. A temperature controller is provided for precisely controlling the rate of heating, and a modulating circuit is positioned in the supply line for modulating the electrical energy supplied to the bars. The heat generated at least partly melts the plastic surrounding the reinforcing bars, thereby relieving stresses in the elongated member. When fully stress-relieved, the elongated member is cut to final length.

17 Claims, 3 Drawing Sheets

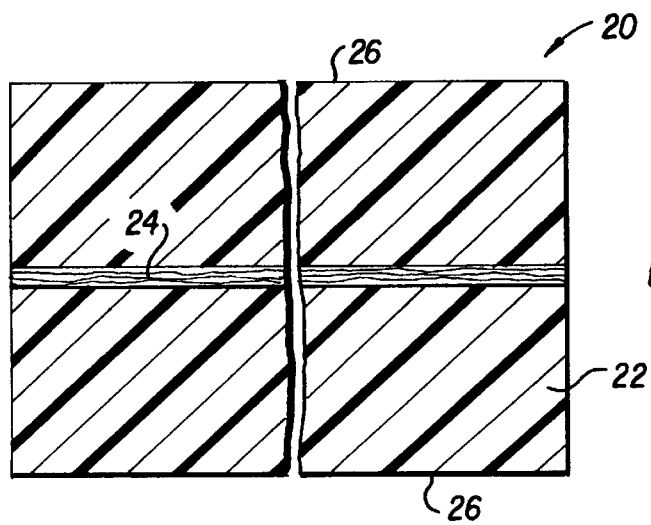
FIG. 4
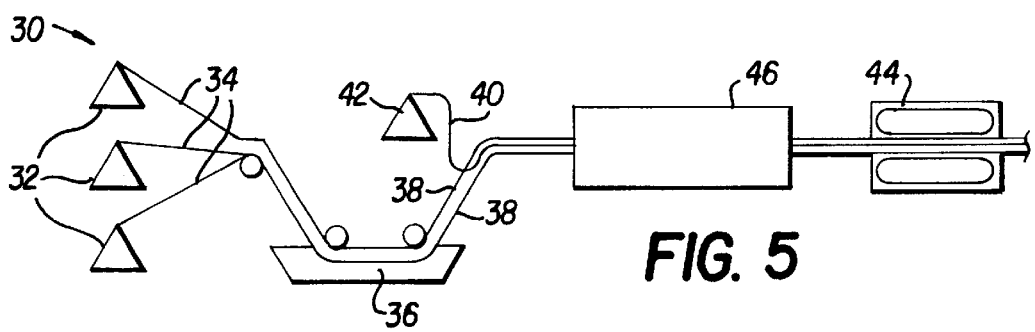
FIG. 5
FIG. 6
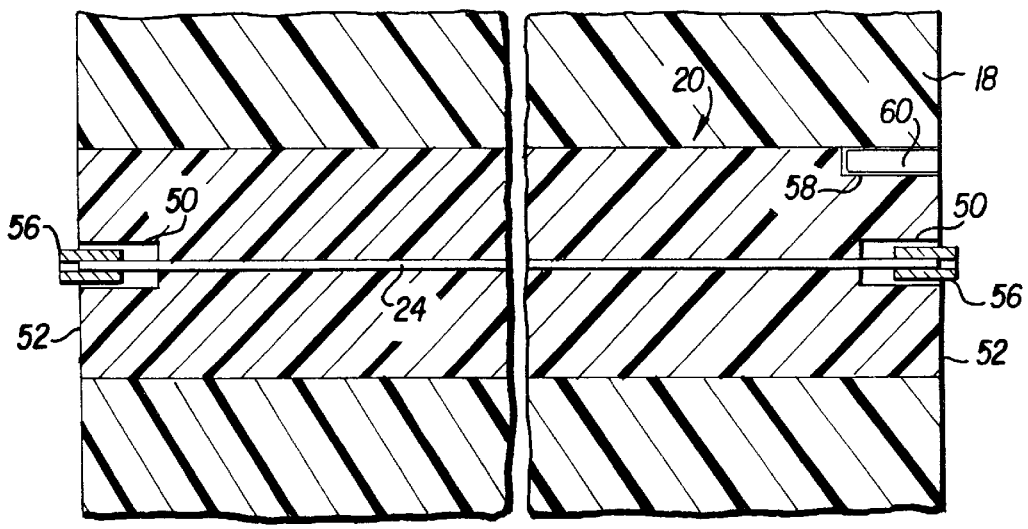

METHOD OF RELIEVING STRESSES IN EXTRUDED MEMBERS HAVING REINFORCING BARS

FIELD OF THE INVENTION

The present invention relates to methods and apparatus for pretreating elongated structural members and more particularly to a method of and an apparatus for relieving thermal and shrinkage stresses in elongated plastic members having fiberglass reinforcing bars.

BACKGROUND OF THE INVENTION

Traditional marine timbers and pilings are made of steel, concrete or wood. Steel and concrete are very heavy and expensive and do not have the desired resiliency for fendering applications. Steel is especially subject to rapid corrosion in a marine environment. Wood suffers from rapid erosion and is subject to attack by marine animals which reduce its effectiveness. To prolong its useful life, wood used for marine timbers and pilings, as well as for non-marine applications such as telephone poles, railroad ties and the like, is sometimes treated with a preservative, such as creosote. However, creosote and other preservatives are detrimental to the environment. Furthermore, given the recent efforts for preservation of forests, the use of wood timbers, pilings, poles and railroad ties is not desirable.

To a great extent, marine timbers and pilings made of plastic solve the foregoing problems with respect to steel, concrete and wood marine timbers and pilings. U.S. patent application Ser. Nos. 08/862,305 filed May 23, 1997, and U.S. Pat. Nos. 5,650,224 and 5,658,519, all of which are assigned to the assignee of the present invention and the subject matter of which is incorporated herein by reference, disclose methods and apparatus for manufacturing extruded plastic members. In the methods disclosed in the aforesaid application and patents, the continuously extruded members are reinforced with a plurality of substantially rigid bars, rods or rebars that are fed to the extrusion die continuously or in discrete lengths. The ends of each bar include joint connections for splicing the bars in end-to-end relation as described in the aforementioned U.S. patent application Ser. Nos. 08/862,305 filed May 23, 1997. The molten plastic entering the die surrounds and bonds to the plurality of reinforcing bars and is then cooled so that the molten plastic, the plastic core and the reinforcing bars are formed into a monolithic elongated member having a predetermined cross-section. The extruded plastic member is then cut into predetermined lengths at the locations of the splices or joint connections so that the reinforcing bars in the extruded member are joint or splice-free.

In the resulting extruded members, the plastic shell is intended to withstand the compressive stresses, and the reinforcing bars are provided for bearing the tensile and shear stresses. It has been found that undesirable internal stresses occur during the cooling of the molten plastic, resulting in the formation of cracks and the eventual failure of the extruded member. Accordingly, there is a need for methods of and apparatus for manufacturing elongated plastic members which relieve or eliminate the thermal and shrinkage stresses that result upon cooling the molten plastic about the reinforcing members. There is a further need for methods of relieving stresses in extruded members that are compatible with existing continuous extrusion processes and apparatus and that may be implemented prior to the final cutting of the member to length.

SUMMARY OF THE INVENTION

The present invention is directed to improved methods of and apparatus for making elongated extruded plastic members and improved reinforcing bars for incorporation in those members that solve the above-described limitations. Additional features and advantages of the invention are set forth in the description which follows, and in part will be apparent from the description, or may be learned by practice of the invention. The objectives and other advantages of the invention will be realized and attained by the method and apparatus particularly pointed out in the written description and claims hereof as well as the appended drawings.

To achieve these and other advantages and in accordance with the purpose of the invention, as embodied and broadly described, the extruded member to which the invention is applicable includes a plastic core having a central longitudinal axis and a peripheral surface and a plastic shell surrounding the plastic core and bonded to the peripheral surface of the plastic core. A plurality of rigid reinforcing bars are molded into the plastic shell in positions substantially parallel to the central longitudinal axis of the plastic core. Each reinforcing bar has a longitudinal electrically conductive wire embedded therein for heating the bar by electrical resistance heating.

The reinforcing bars are manufactured according to pultrusion methods known in the art. Pultrusion is a continuous process in which a roving bundle of fiber reinforcing material, such as glass, is arranged into a desired orientation, impregnated with resin, and passed through a heated die for setting or curing. According to the present invention, wire is introduced into the roving bundle prior to entry into the heated die. The pulling action downstream of the heated die is used to draw the fiber reinforcing material and the wire through the heated die. The final product is a rigid reinforcing bar having a longitudinal wire extending its entire length.

The elongated member is made by continuously extruding a molten plastic die and feeding a substantially solid plastic core into the die, the core having a lower temperature than the molten plastic. A plurality of reinforcing bars having wire embedded therein are also fed into the die so that the reinforcing bars are substantially parallel to the longitudinal axis of the die and are positioned around the peripheral surface of the core. The reinforcing bars are individually connected to the reinforcing bars of the preceding extruded members using the aforementioned joint connections. The molten plastic entering the die surrounds and bonds to the surfaces of the reinforcing bars and to the peripheral surface of the plastic core. The molten plastic is then cooled so that the molten plastic, the plastic core, and the plurality of reinforcing bars are formed into a monolithic elongated member having a predetermined cross-section, with the plastic core acting as a heat sink to facilitate cooling of the molten plastic. It should be understood that the elongated member may be formed as a hollow structure, with the plastic core being replaced with a longitudinal bore extending the length of the member.

According to the present invention, once the elongated member exits the cooling station, it is cut at the reinforcing bar joints and prepared for electrical resistance heating. Specifically, counterbored holes or recesses are drilled in the ends of the reinforcing bars to expose the ends of the embedded wire. Collets or other removable electrical contacts are inserted into the counterbored holes such that the contacts are electrically connected to the embedded wire. An additional hole for receiving a thermocouple probe is provided in each reinforcing bar of the extruded member at an interface between the bar and the surrounding plastic shell. The contacts are then electrically connected to a power source which generates an AC current in each of the embedded wires, the electrical resistance of which results in heating the wire and the reinforcing bar in which the wire is imbedded. For safety reasons, isolation transformers are provided in the electrical supply lines to the wires. The heat generated by the flow of current through the wires embedded in the reinforcing bars raises the temperature of the bars and causes the plastic at the interface between the plastic shell and the reinforcing bars to soften or partially melt thereby relieving stresses in the plastic shell caused by shrinkage during cooling of the plastic. A temperature controller, in response to feedback from the thermocouple, turns the power source on and off by operating a solid state relay.

The reinforcing bars are heated to a temperature within a prescribed temperature range and maintained at a temperature within that range for a predetermined period of time to stress relieve the elongated member. The temperature range and time of application of electrical energy to the wires are experimentally determined for a given configuration of elongated member and reinforcing bars. After the extruded elongated member is fully stress-relieved, final length layouts are made and the member is cut to length.

The present invention provides for the time-efficient, economical manufacture of plastic marine timbers, pilings and similar elongated plastic structures. Manufacture of the reinforcing bars requires the introduction of an electrical conductor into a pultruded member made according to an otherwise standard pultrusion process. No additional steps or modified equipment are required. The process for extruding the elongated member remains the same. At the completion of the extrusion, but prior to final cutting, the elongated member is treated using the stress-relieving apparatus as described herein, which may be easily retrofitted into existing systems directly preceding the final cutting station. Elongated members manufactured according the present invention have an extended life and are less prone to failure.

With the foregoing and other objects, advantages and features of the invention that will become hereinafter apparent, the nature of the invention may be more clearly understood by reference to the following detailed description of the invention, the appended claims and to the several views illustrated in the attached drawings.

BRIEF DESCRIPTION OF THE DRAWINGS

FIG. 4 is a longitudinal sectional view of the reinforcing bar shown in FIG. 3 taken along line 4—4 of FIG. 3;

FIG. 5 is a schematic illustration of a system for making a reinforcing bar of the present invention;

FIG. 6 is a fragmentary longitudinal sectional view of an elongated member showing the reinforcing bar of the present invention prepared for heat treatment.

DETAILED DESCRIPTION OF THE INVENTION

Figure 1:
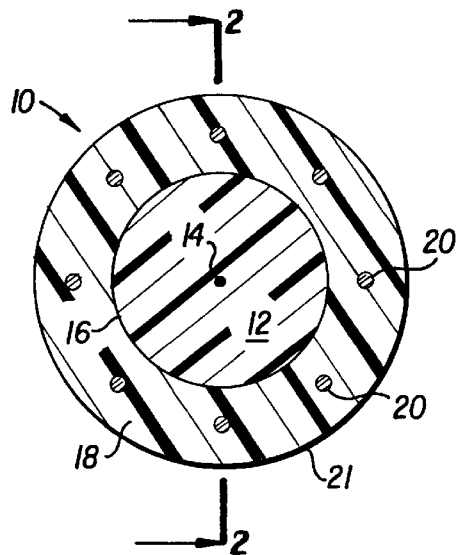
FIG. 1 is a cross-sectional view of an embodiment of an elongated member having reinforcing bars provided therein.
Figure 2:
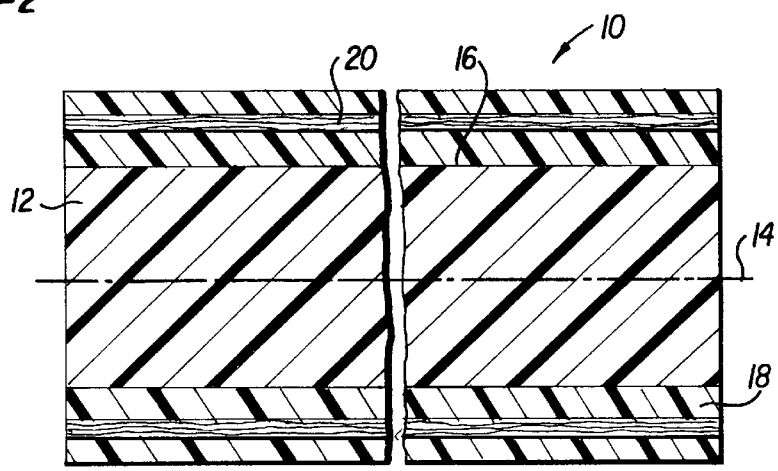
FIG. 2 is a longitudinal sectional view of the elongated member shown in FIG. 1 taken along line 2—2 of FIG. 1.

Reference will now be made in detail to the preferred embodiments of the invention, examples of which are illustrated in the accompanying drawings, wherein like parts are designated by like numerals throughout. FIGS. 1 and 2 illustrate an exemplary embodiment of the elongated member to which the present invention is applicable and is designated generally by reference numeral 10. Elongated member 10 includes a plastic core 12 having a longitudinal axis 14 and a peripheral surface 16. A plastic shell 18 is bonded to the peripheral surface 16 of the core 12 and includes a peripheral surface 21. The plastic core 12 acts as a heat sink to facilitate cooling of the plastic shell 18. The plastic core 12 may be replaced with a central longitudinal bore extending the length of the member 10. Inclusion of a central bore reduces the plastic material needed and allows for water jet driving of the member into the earth. A plurality of reinforcing bars 20 are disposed within the plastic shell 18 and are substantially parallel to the central longitudinal axis 14 of the elongated member 10. At least four reinforcing bars 20 are preferably used. The diameter and composition of the reinforcing bars 20 are chosen to give the desired strength properties.

Figure 3:
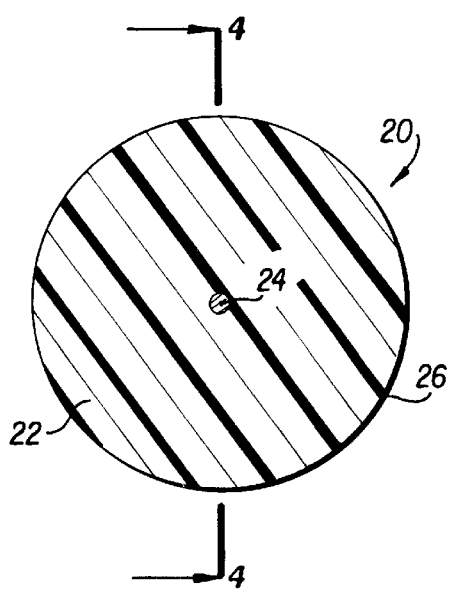
FIG. 3 is a cross-sectional view of a reinforcing bar of the present invention.

As shown in FIGS. 3 and 4, each reinforcing bar 20 is a solid fiberglass body 22 having a longitudinal wire 24 or other electrical conductor extending the length thereof. In preferred embodiments, the wire 24 is a ¹⁄₁₆ inch diameter welding wire known in the industry as MIG wire, and having a resistance per foot of about 0.005 ohms. An exterior profile, such as transverse ribs, or helical grooves may be provided along the peripheral surface 26 of the reinforcing bar 20 to facilitate bonding between the reinforcing bar 20 and the surrounding plastic shell 18.

For optimum construction and ease of manufacture, pultruded fiberglass rods or rebar are preferably used. A system 30 for pultrusion casting reinforcing bars having the electrical conductor embedded therein is shown in FIG. 5. Continuous spools 32 of fiber reinforcing material 34, such as glass, are drawn continuously through a matrix of thermoset resin 36 such as polyester or vinyl ester. The impregnated fibers 38 are then fed, along with an electrical conductor 40, into a curing and shaping die 46. The electrical conductor 40 is supplied from a continuous spool 42 of ¹⁄₁₆ inch diameter MIG welding wire. Spool 42 is positioned such that the conductor 40 is preferably introduced into the center of the roving bundle of impregnated fiber 38. A drawing machine 44 downstream of the curing and shaping die 46 pulls or draws the impregnated fibers 38 and the centrally-located wire 40 into and through the curing and shaping die 46. The curing and shaping die 46 heats and shapes the fiberglass fibers (preferably two or more fibers for each bar) soaked with the thermoset resin around the central longitudinal conductor to form a pultrusion cast fiberglass bar. For providing uniform heating, the fibers 38 are cured around the conductor 40 such that the conductor 40 is coincident with the central longitudinal axis of the pultruded reinforcing bar 20. The cured or partially cured bar may also be wrapped with a fabric material, such as polyester, and then helically wrapped with fiberglass fibers to form a profile. When curing is complete, each bar 20 is individually checked for electrical continuity.

Once the reinforcing bars are formed and cured into substantially rigid structures, they are cut to appropriate lengths, e.g., thirty feet, sixty feet, eighty feet, etc., corresponding to the desired length of the elongated member to be extruded. In accordance with the present invention, the desired length of the elongated member must be predetermined so that reinforcing bars of an appropriate length may be selected and supplied to the extrusion apparatus. That premeasurement is important as it is desired to have the ends of the reinforcing bars coincide with the ends of the elongated member as explained in the aforementioned U.S. patent application Ser. No. 08/862,305. Allowances for reduction in length must be made when cutting the reinforcing bars to appropriate lengths, as the joint preparation and stress-relieving operations of the present invention remove length from both ends of each bar. The completed reinforcing bars may be immediately introduced into the forming die of an apparatus for making the elongated structural members or placed in inventory for future use.

Elongated extruded members having the reinforcing bars provided therein are manufactured using conventional methods and apparatus, such as those described in U.S. Pat. Nos. 5,650,224 and 5,658,519. Typical formation methods include the steps of feeding reinforcing bars into a die with the longitudinal axes thereof arranged substantially parallel to the longitudinal axis of the die, continuously feeding a molten plastic into the die, flowing the molten plastic around and in contact with the peripheral surfaces of the reinforcing bars, continuously extruding the molten plastic through the die together with the reinforcing bars to form the molten plastic into a continuously extruded member with an outer surface, and cooling the extruded member.

Once the elongated member is pulled away from the die and cooling and shaping station, a cutter is used to cut the elongated member at the location of the reinforcing bar splices. Methods and apparatus, such as those described in U.S. patent application Ser. No. 08/862,305, may be used to precisely locate the reinforcing rod splices in the extruded member and to cut the member at those splices. As shown in FIG. 6, counterbored holes or recesses 50 are formed in the ends 52 of the reinforcing bar 20 to expose the outermost ends of the embedded wire 24, typically by counterboring out a portion of the bar 20 surrounding the wire 24 with a pilotless counterbore tool. The counterbored holes 50 are of a size and are positioned so that a removable contact 56 can be inserted into the holes 50 and electrically connected to the wire 24. An additional longitudinal bore 58 is provided in one end of each reinforcing bar 20 proximate the peripheral surface 26 of the reinforcing bar 20 and at the interface between the reinforcing bar and the plastic shell 18 for receiving a thermocouple probe 60. Bore 58 is generally parallel to the longitudinal axis of the reinforcing bar 20, is usually about two inches deep and has a diameter slightly larger than the diameter of the probe 60.

To prepare each reinforcing bar for heating, an electrical contact 56, such as a 1/16 inch diameter collet, is securely fastened to each end of wire 24. The contact 56 is preferably removable from the wire and reusable on the wires of other reinforcing bars. Other suitable and equivalent electrical connection means may be used to electrically connect the wires to the circuit of FIG. 7.

Figure 7:
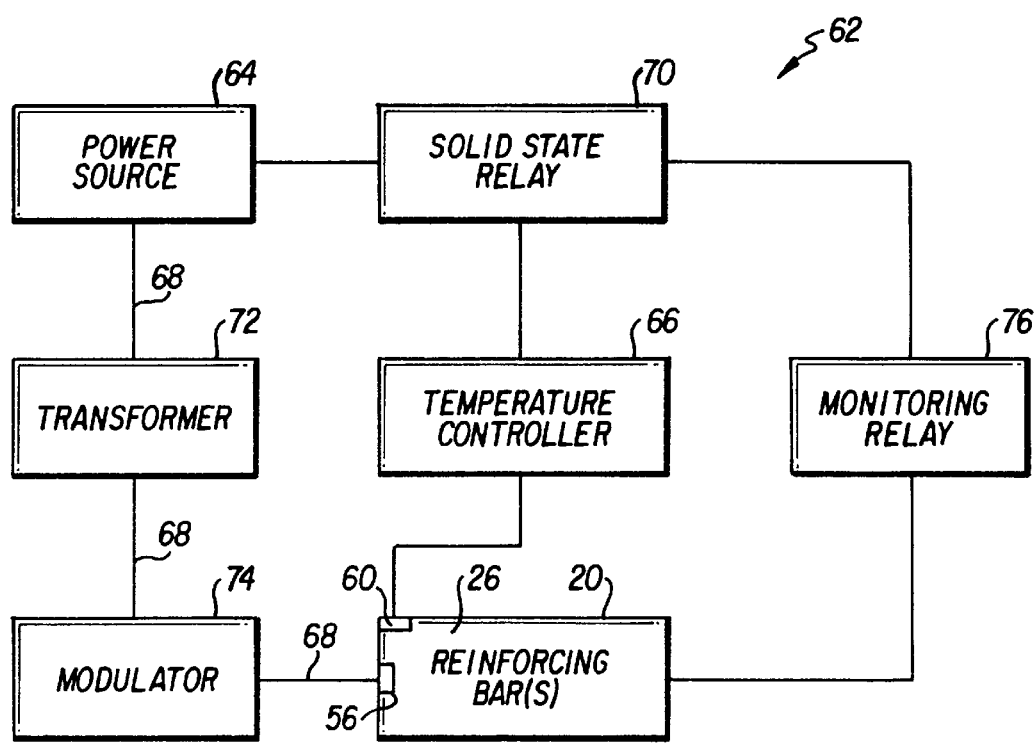
FIG. 7 a schematic illustration of the system for relieving thermal and shrinkage stresses from the elongated member of the present invention.

Referring now to FIG. 7, there is shown in a schematic illustration a heating apparatus or system 62 that is used to safely, efficiently and precisely relieve thermal and shrinkage stresses in the formed and cut elongated member. The system 62 includes at least one power source 64 and temperature controller 66 for treating the reinforcing bar 20 via controlled electrical resistance heating. The contacts or collets 56 attached to the ends of the wire 24 in each reinforcing bar 20 are connected to the power source 64 by an electrical connector 68. The power source 64 supplies an alternating current and provides power transfer to the wire in each reinforcing bar 20 at a rate of between about 20 and 40 watts per foot, with the optimum level being generally about 30 watts per foot. Heat is generated in each reinforcing bar 20 as current passes through the embedded wire 24. Typically, when the peripheral surface 26 of the fiberglass reinforcing bar 20 reaches about 185° F., the plastic shell at the surface of the reinforcing bar 20 begins to melt, thereby reducing the strength of the bond between the plastic shell 18 and the peripheral surface 26 of the reinforcing bars 20 and relieving the stresses in the surrounding plastic shell 18. The temperature along the peripheral surface 26 of the reinforcing bar 20 is continuously monitored by the temperature controller 66, such as a proportional-integral-derivative temperature controller, connected to the thermocouple probe 60 positioned in the reinforcing bar 20. When the temperature sensed along the peripheral surface 26 of the reinforcing bar 20 reaches a preset upper limit, the controller 66 energizes a solid state relay 70, breaking the circuit and turning the power source 64 off. That preset limit is preferably about 200 degrees F. Following a cool-off period, which may be in the range of about 12 hours, the power source is turned on, with the procedure being repeated as many times as needed to remove the thermal and shrinkage stresses.

It will be apparent to those skilled in the art that the number of power sources and temperature controllers used to heat treat a single elongated extruded member may be modified without departing from the scope of the present invention. For example, a single power source may supply the requisite power to all, a few, or only one of the reinforcing bars of an extruded member. It is further possible to have multiple power sources connected to a single reinforcing bar. Similarly, the system can include one or many temperature controllers, with each controller being operably connected to the thermocouple probes of one or more reinforcing bars. The arrangement of the power source connections, i.e., in series or parallel, is also a matter of design choice, with all possible arrangements considered to be within the scope of the present invention.

The heating system 62 can include other components for controlling the heating operation. As shown in FIG. 7, an isolation transformer 72 is positioned along line 68 leading from the power source 64 to the reinforcing bars 20 for adjusting the voltage of the alternating current originating from the power source 64. In one embodiment, the transformer 72 is tap adjusted for either 240 VAC or 120 VAC. For providing further control over the heating process, a modulator 74 is provided along line 68 leading from the power source 64 to the wires 24 in the reinforcing bars 20 for variably adjusting the root-mean-square value of the alternating current. For enhanced safety, a current monitoring relay 76 is provided for instantaneously shutting down the system 62, specifically, the power source 64, in the event of an open circuit condition, e.g., when a lead 68 or contact 56 becomes disconnected from a wire 24 in a reinforcing bar 20.

The difference in length between the plastic shell of the elongated member and the reinforcing bars is periodically measured during the stress-relieving process. That difference is compared with known values for the same product to provide the operator with an acceptable estimate of when the elongated member is fully stress-relieved. After it is determined that the extruded elongated member is fully stress-relieved, final length layouts are made and the member is cut to length by any acceptable cutting method.

The elongated members made according to the above-described method and system are suitable for many uses, such as marine timbers, pilings, telephone poles, railroad ties, etc. For use as a marine piling, the elongated member will typically be between about ten to sixteen inches in diameter and between about thirty to eighty feet in length of continuous structure. Additionally, the heat treating method and system of the present invention is easily incorporated into existing extruded member manufacturing operations subsequent the final cutting stage.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A method of producing an elongated, substantially rigid structural member suitable for use as a marine timber or piling comprising the steps of:

providing a plurality of discrete, substantially rigid reinforcing bars of a given length, each bar having an electrical conductor extending substantially the entire length thereof;

feeding said reinforcing bars and molten plastic into an extrusion die;

extruding said molten plastic through said die together with said reinforcing bars to form a continuously extruded member; and relieving stresses in said extruded member by passing electric currents through said electrical conductors embedded in said reinforcing bars.

2. The method of claim 1, wherein providing said reinforcing bars includes pultrusion casting impregnated fiber reinforcing material in combination with said electrical conductor.

3. The method of claim 2, wherein said pultrusion casting step includes impregnating fibers with thermoplastic resin, arranging said fibers into a bundle, introducing said electrical conductor into said bundle, and curing and shaping said bundle around said electrical conductor.

4. The method of claim 1, wherein said relieving step includes partially melting the plastic of said extruded member by passing said electrical current through said electrical conductor.

5. The method of claim 4, wherein said electrical conductor is MIG welding wire having a diameter of about 0.062 inches.

6. The method of claim 4, wherein said melting step includes heating said reinforcing bars to a predetermined upper temperature limit, interrupting said electrical current when said predetermined upper temperature limit is reached, and reapplying said electrical current through said reinforcing bars.

7. The method of claim 6, wherein said predetermined limit is about 200° F.

8. The method of claim 1, wherein passing said electrical current through said electrical conductor includes transferring power to each of said reinforcing bars at a rate between about 20 and 40 watts per foot.

9. The method of claim 1, wherein passing said electrical current through said electrical conductor includes adjusting voltages of said currents and variably adjusting root-mean-square values of the currents.

10. A method of relieving stresses in a plastic elongated member comprising the steps of:

providing an elongated member, said elongated member including at least one longitudinal reinforcing bar cast in a plastic matrix, with said at least one reinforcing bar having a longitudinal wire embedded therein and a peripheral surface in contact with said plastic matrix; and relieving stresses formed about said peripheral surface of said reinforcing bar, said relieving step including partially melting said at least one reinforcing bar by passing an electrical current through said wire.

11. The method of claim 10, wherein said melting step includes maintaining said peripheral surface of said at least one reinforcing bar at a temperature in the range of about 185–200° F.

12. The method of claim 10, including cutting ends of said member to expose said wire in said bar prior to relieving said stresses.

13. The method of claim 12, including the step of drilling a bore in said bar adjacent said wire.

14. The method of claim 10, wherein said stress-relieving step includes providing contacts electrically connected to said wire, delivering power to said at least one bar through said contacts at a rate of between about 20 and 40 watts per foot.

15. The method of claim 14, including monitoring a temperature at said peripheral surface of said at least one reinforcing bar.

16. The method of claim 15, wherein said monitoring step includes sensing a temperature at said peripheral surface, comparing said temperature with a preset temperature, and interrupting electrical power to said at least one reinforcing bar when said temperature reaches said preset limit.

17. The method of claim 16, wherein said preset limit is about 200° F.

* * * * *